E. A. VESSEY.
SCREW PROPELLER.
APPLICATION FILED NOV. 29, 1918.

1,365,132.

Patented Jan. 11, 1921.
5 SHEETS—SHEET 3.

INVENTOR
E. A. Vessey.
BY H. R. Kerslake
ATTORNEY

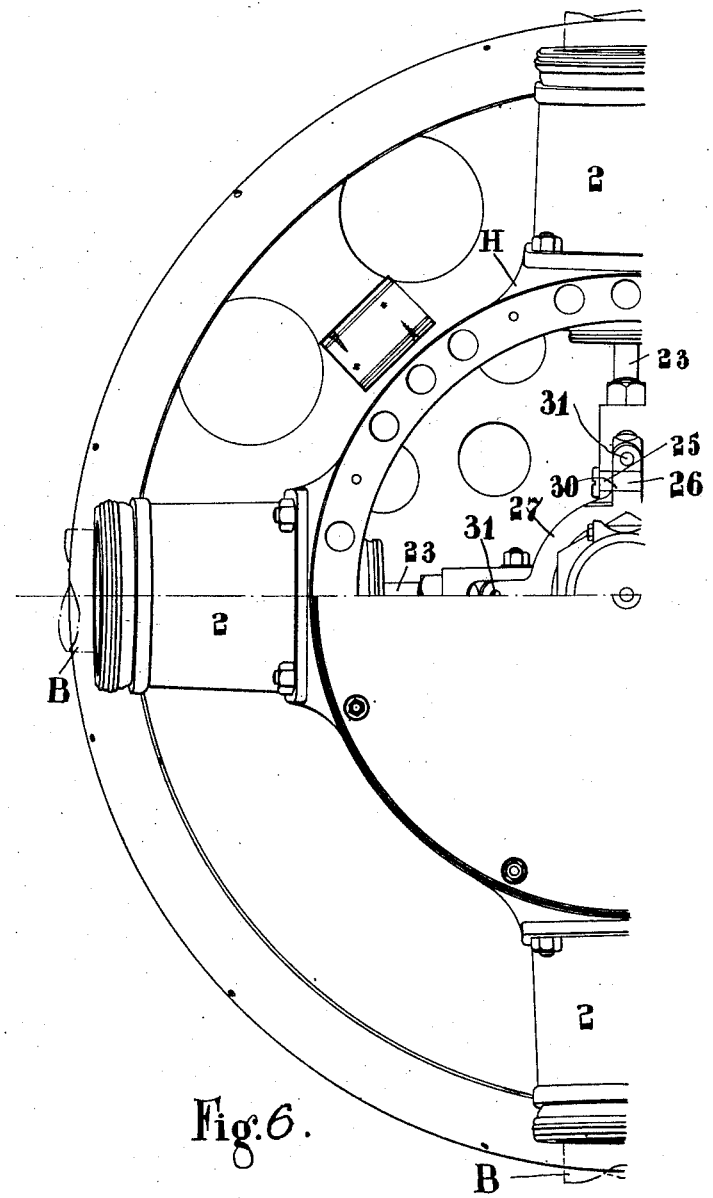

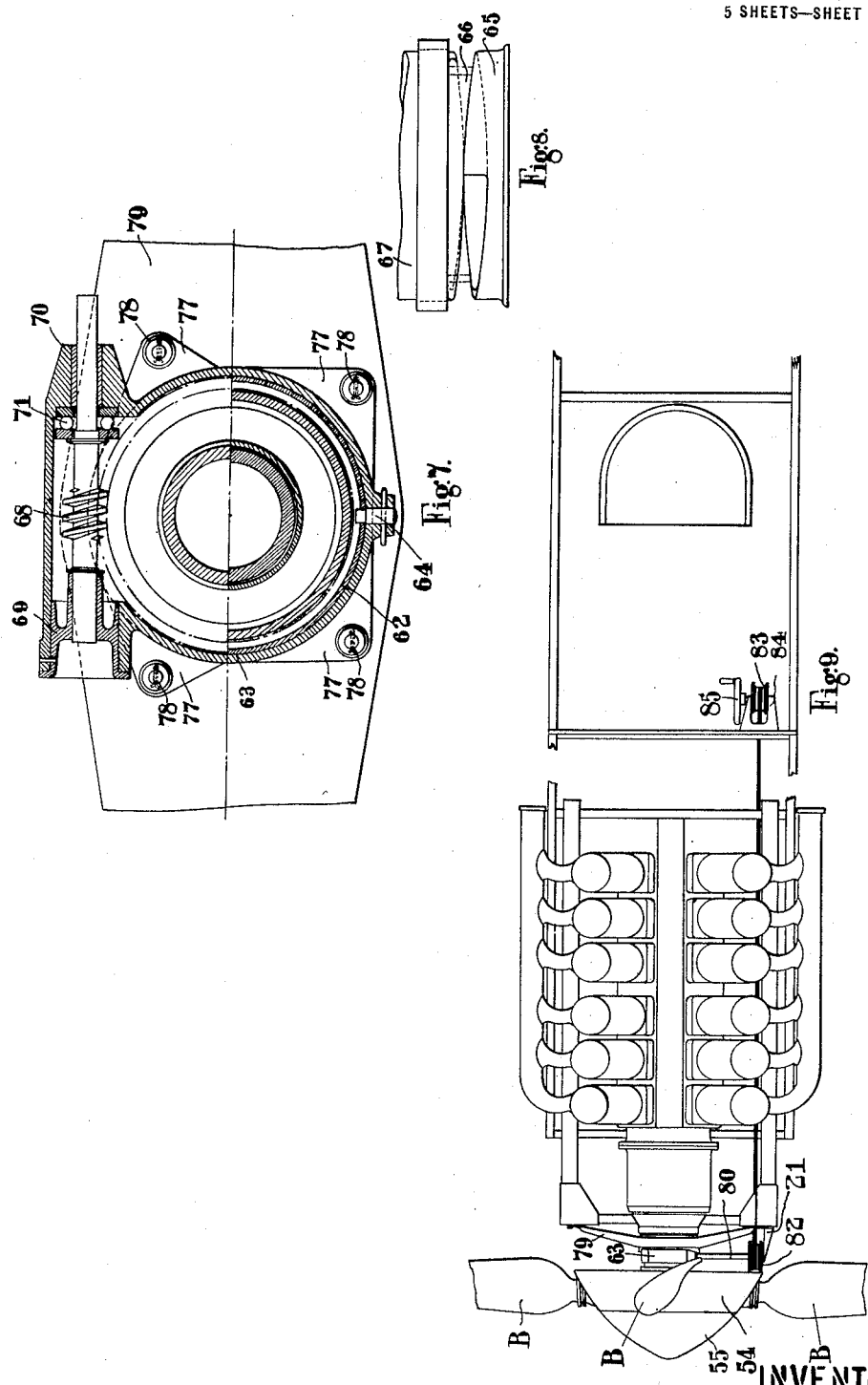

UNITED STATES PATENT OFFICE.

ERNEST ABINGTON VESSEY, OF FARNBOROUGH, ENGLAND.

SCREW-PROPELLER.

1,365,132.   Specification of Letters Patent.   Patented Jan. 11, 1921.

Application filed November 29, 1918. Serial No. 264,761.

*To all whom it may concern:*

Be it known that I, ERNEST ABINGTON VESSEY, a subject of the King of Great Britain and Ireland, and residing at St. Newitt, Ashley Road, Farnborough, in the county of Hants, England, have invented certain new and useful Improvements Relating to Screw-Propellers, of which the following is a specification.

This invention relates to screw propellers of the known type in which the effective diameter may be varied, and a variation of diameter is caused, if desired, to effect a variation of pitch of the propeller blades. The invention is applicable to propellers working in liquids as well as in fire screws or other elastic fluid propellers.

The principal objects of the present invention are to simplify the construction of such propellers, to avoid the difficulties usually arising from the large centrifugal forces which come into operation, to provide for the secure holding of the separate blades at their root ends, and generally to enable improved results to be attained by the efficient control of the required blade movements.

The invention comprises one or more of the following features, viz:

(*a*) Arranging that the centrifugal force acting on the blades is resisted by simple tension elements connected so as to practically balance one another;

(*b*) Arranging the blade ends in approximately radial sockets in the hub, permitting approximately radial movement under centrifugal force, and utilizing this movement under control of the tension members to obtain an increased effective propeller diameter;

(*c*) Utilizing the radial movement in the hub under centrifugal force by means of co-acting screw elements to vary the pitch through any required range by effecting rotation of the propeller blades on their axes;

(*d*) Employing wedge elements under the action of centrifugal force to secure the blade ends; and (*e*) Arranging the hub sockets at a slight angle to the plane perpendicular to the shaft axis and/or to the radial planes through the shaft axis, so as to provide a component of centrifugal force whereby centrifugal force more or less relieves the blades of bending stresses due to the air reactions.

The invention further consists in jointing the inner ends of the connective tension elements to a ring element slidable axially relative to the hub, by the axial movement of which the effective diameter and effective pitch of the propeller can be varied within predetermined limits.

The invention also consists in the combination with the said devices of positively operated means for controlling the effective pitch of the propeller.

I append drawings illlustrating my invention.

Fig. 6 is a view at right angles to that shown in Fig. 1, the upper part having an outside detachable cover removed.

Figure 1:
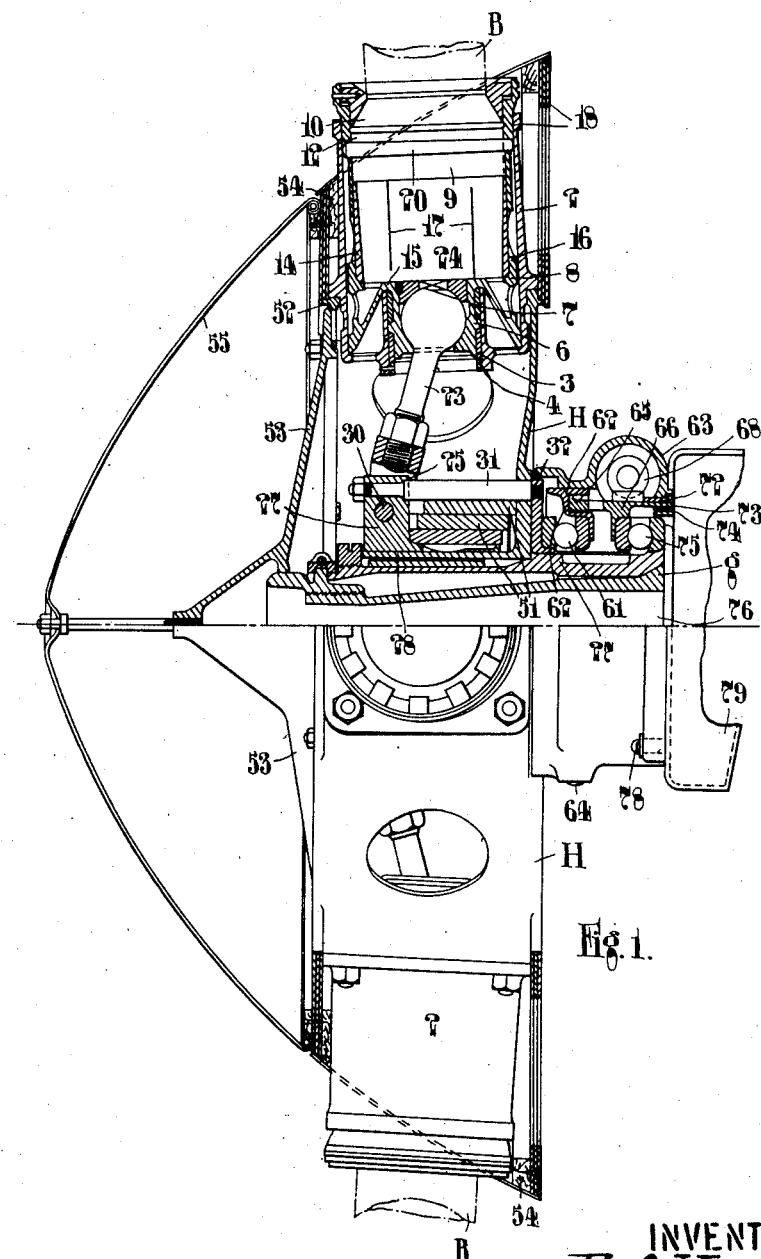
Figure 1 is a view projected on a plane parallel to the shaft axis, the upper part being in section.

Figs. 7 to 9 relate to the form of the control mechanism as shown in Fig. 1.

In carrying the invention into effect in one form, by way of example, as applied to a four-bladed air propeller, I construct a light metal shell or hub H having tubular sockets 2, one for each of the blades B. These sockets may be separable, or may be welded on to the hub shell, or be solid therewith. These tubular sockets carry at their radially inner ends cylindrical parts 3 of less diameter internally threaded, one side of the thread being formed solid, and the other side in a bushing 4, so held that the thread can be maintained in close contact on the male thread 6, and back lash thus prevented. The male thread 6 is formed on the outside of a cylindrical projection or boss 7 on the radially inner end of a cylindrical shell 8 fitting within the aforesaid radially inner end of the socket 2. This shell 8 forms a protective casing in fixed relationship to the wooden spigot end 9 of the propeller blade, which spigot is preferably turned with a double conical surface, a short or steep conical part 10 being formed at the root of the shaped part of the propeller blade, and from the maximum diameter 12 of this conical part the second opposed conical surface 14 is formed by reducing the diameter of this portion of the spigot 9 toward its end 15, which abuts against the bottom of the shell 8. A conical space is thus left between the long cone of the spigot and the cylindrical surface of the shell into which its largest diameter fits. This conical space I fill with an expansible wedge sleeve 16, which is slit at a number of places 17 alternately from each edge, so as to be free to expand or contract in diameter. This wedge sleeve is placed within the shell 8, and the conical surface 14 of the spigot is placed within it. A screwed conical ring 18 made in halves for convenience of assembly, fitting the neck of the blade, is then screwed within the shell 8, and the spigot of the blade is thus clamped in place. A transverse pin 20 may be applied through the shell 8, wedge sleeve 16, and spigot 9 of the blade, passing through two of the beforementioned slits in the wedge sleeve, so that the blade carrying with it the shell and wedge sleeve, is perfectly free to move under centrifugal force, but the blade cannot rotate with respect to the shell.

Holes may be provided in the walls of the tubular socket 2 to allow of the fitting and removal of the transverse pin 20 of such a size as to allow of the necessary angular and axial movement of the blade. The transverse pin 20 is then made preferably long enough to project permanently through the holes in the tubular socket, thus preventing the blade from flying off in case of accident to the mechanism. When the blades become subjected to centrifugal force the wedge securely beds against the long cone of the spigot of the blade, locking the blade firmly and taking up any slack which may occur, e. g. from shrinkage. In the example illustrated, the transverse pin 20 is not made long enough to project through the hub, and the wedge sleeve 16 is so short that the transverse pin does not pass through it.

As an alternative method for obtaining angular motion of the blade as a result of radial movement, it may be convenient instead of providing the screwed extension of the hub socket and shell for the blade end to adapt the transverse pin to work in spiral slots formed in the walls of the tubular socket, means for adjusting for back lash and wear being provided. Such alternative method is not illustrated in the drawings.

The tubular sockets are preferably set at a slight angle to the plane at right angles to the propeller shaft, so that an axial component of the centrifugal force is applied to the blade in opposition to the thrust, and thus the blade is more or less relieved of bending stress due to the axial thrust. Further, the tubular sockets and the axes of the blades may be arranged at a slight angle to the radial planes through the shaft axis, thus in a similar manner relieving the blades of bending stress due to torque.

The externally screwed boss 7 on the shell 8 sheathing the blade end is socketed to receive the spherical end 22 of a short connecting rod 23, which is adapted to project through an opening in the inner end of the boss. This connecting rod end is held in place by a ring 24 screwed into the outer end of the boss. The other end of the connecting rod is forked at 25, and embraces a lug 26 projecting from a ring element 27 movable axially on the exterior of the central sleeve 28 of the hub shell. The forked end of the connecting rod is jointed to the lug 26 by means of the pin 30. Each of the blades is similarly mounted, so that they are all anchored to the same ring element. The principal component of the centrifugal force on each blade is thus balanced through the element. The sliding ring element 27 within the hub, which is linked to the blades, is conveniently also provided with a spring 51 more or less balancing the axial components of the forces applied by centrifugal force to the blades. Alternatively there may be a series of springs arranged around the ring element and parallel to the axis, the resultant effort of the said series of springs being co-axial with the shaft. The ring element 27 is provided also with a number of studs 31, which project through the hub casing, and are screwed into a flanged ring 32 external to the hub slidable axially on the propeller shaft and which is provided with ball thrusts, so that axial forces in either direction can be applied to it by means of a nonrotating ring 33 between the ball thrust bearings. The said thrust bearings are independent of the propeller shaft thrust bearing, which is not shown on the drawing. Pins 34 on the ring 33 are linked up by means of the suitable lever h with a screwed rod, under the control of a divided nut carried in suitable bearings, and operated by means of a hand wheel q under the control of the pilot, (Fig. 4).

Figure 3:
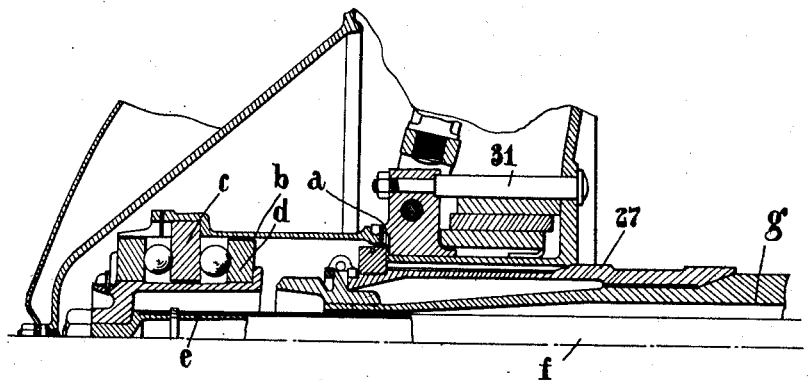
Fig. 3 is a view of a modified form of part of the mechanism which may be applied to a hollow propeller shaft.

Should the propeller shaft be hollow, for example, when it is geared to the engine shaft, the screwed rod will, in this case, pass directly through the center of the hollow shaft to engage a smaller ball thrust fitted in an extension of the ring element 27. One form of this arrangement is shown in Fig. 3. The ring element 27 is provided with a cylindrical extension $a$ screwed externally to receive the thrust sleeve $b$ which is adapted at the outer end to accommodate the ball thrust $c$. The ball thrust $c$ is connected by means of the flanged sleeve $d$ to a socket $e$ which is in turn attached rigidly to the operating rod $f$ which passes through the center of the hollow shaft $g$ of the engine, and is screwed at the other end. The screwed rod is therefore capable of exerting pressure in either direction to the rapidly revolving ring element 27 without being required to rotate itself. The studs 31 are provided at their outer ends with heads of suitable form to take the pressure of the spring when the screw propeller is at rest.

Figure 2:
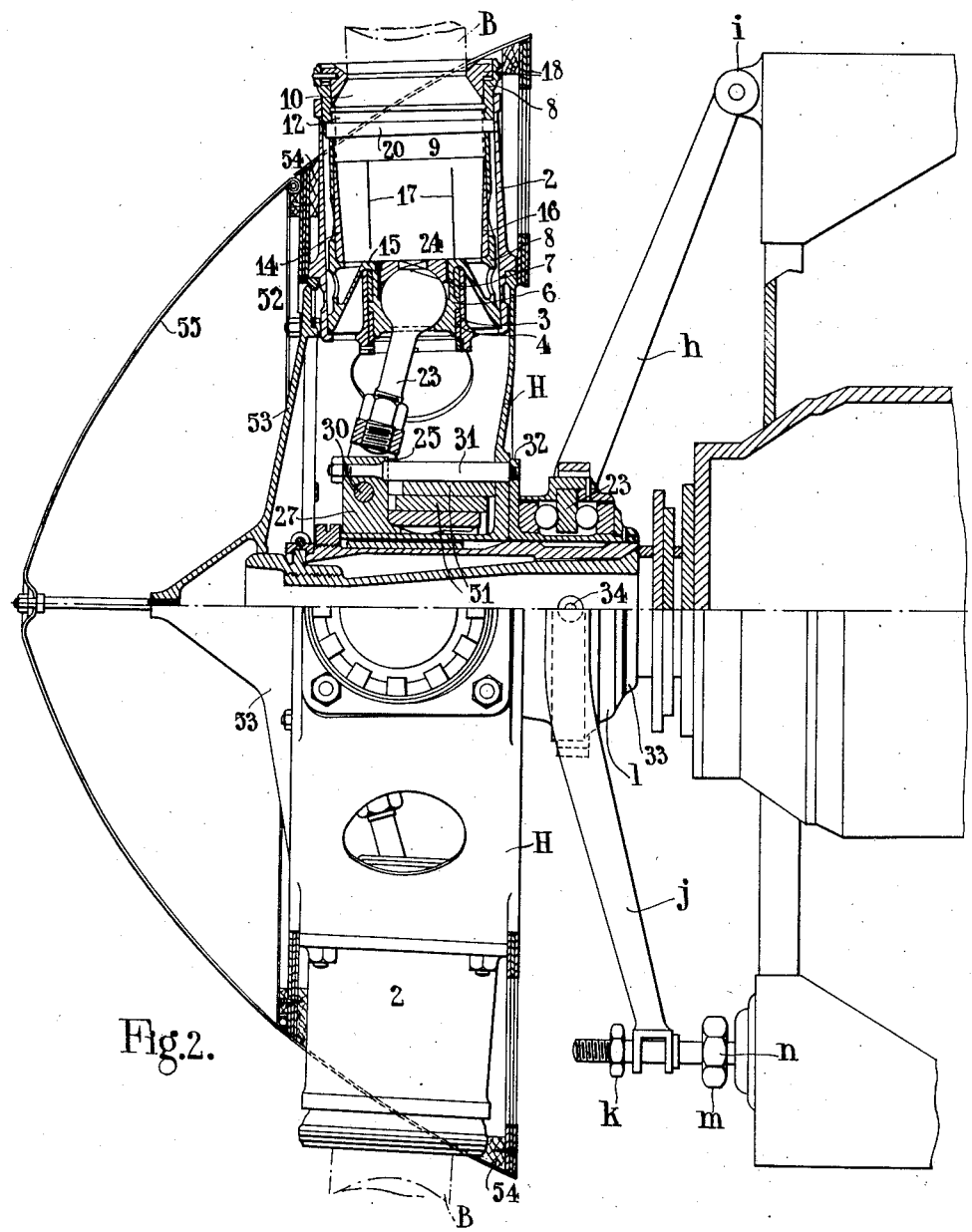
Fig. 2 is a similar view showing another form of control mechanism.
Figure 4:
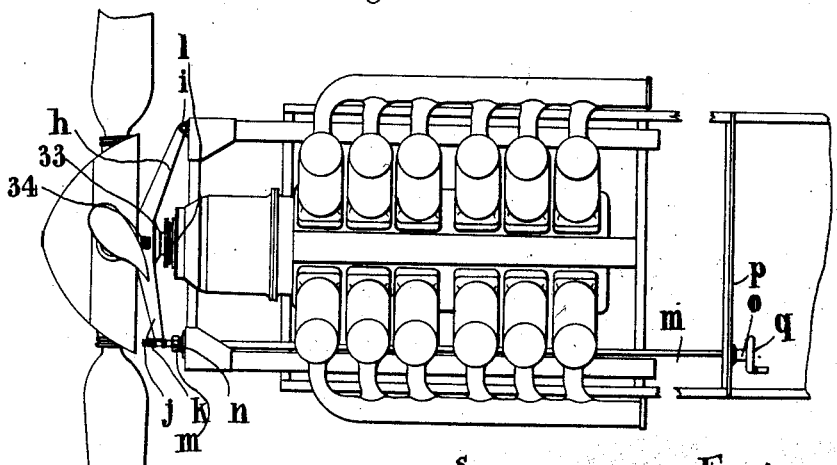
Fig. 4 is the plan view of the front portion of a tractor aeroplane showing one form of the hand-operated control mechanism by means of which the variation in pitch is effected.

One method for operating the mechanism, which is particularly applicable to the design shown in Fig. 2, is shown in Fig. 4. The lever $h$ which extends horizontally across the front of the aeroplane frame is pivoted at one end $i$ and forked at the other $j$ to engage the divided nut $k$. At or near the center of its length the lever is enlarged to surround the stationary ring 33 of the propeller to which it is pivotally connected by means of the bushes $l$ which are capable of slight sliding motion in the lever. These bushes are bored to receive the pins 34 of the stationary ring 33. Penetrating the divided nut $k$ is the screwed rod $m$ which passes through the thrust bearing $n$ and a second bearing $o$ conveniently fixed to the instrument board $p$ of the aeroplane. A handwheel $q$ is fitted to the screwed rod, thus enabling it to be easily manipulated from the pilot's seat.

Figure 5:
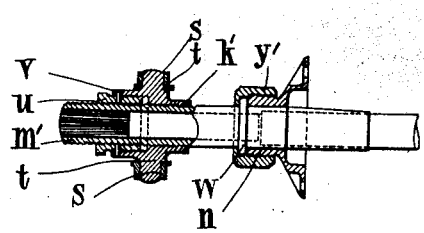
Fig. 5 is a sectional view giving a modified detail of the divided nut and thrust bearing, forming part of the mechanism shown in Fig. 4.

The end of the screwed rod $m$ where it passes through the divided nut and thrust bearing is shown in enlarged modified section in Fig. 5. The main part of the nut $k'$ is provided with pivots $s$ which engage the fork end of the lever by means of bushes $t$. One end of the nut $k$ is enlarged and screwed internally to receive a gland ring $u$. The gland ring is screwed internally to receive the screwed rod and externally to fit the internal screw in the enlarged part of the nut. The external threads may be of opposite hand or different pitch to the internal threads thus providing a differential adjustment. The gland ring is locked by the clip $v$. The thrust of the screwed rod is taken on the collar $w$ which abuts in one direction against the bearing $n'$ and at the other against the internally flanged nut $y'$.

The alternative form of the control mechanism shown in Figs. 7 to 9 (which is the preferred form) comprises more convenient means for providing the required axial movement of the ring element 27 and the flange ring 32 rigidly fastened thereto. Surrounding the flanged ring 32 in this form of the control mechanism is a thrust bearing 61. The bearing abuts in one direction against the shoulder of the flanged ring and in the other against a collar 62 formed in a sleeve surrounding the shaft. The sleeve is arranged to slide freely in a case 63, but is prevented from rotating by a key pin 64 which engages in a slot formed in the rim of the sleeve. Integral with or screwed to the sleeve is an annular surface cam 65, which engages with a similar cam formed on the end of a second co-axial sleeve 66. On the external surface of the second sleeve 67, but not necessarily surrounding it, are cut skew teeth which engage with a worm 68 running in bearings 69 and 70 in the case. One bearing 69 is, for convenience of assembly, made detachable. A ball thrust bearing 71 is provided to take the end thrust of the worm. The second sleeve is adapted to be displaced circumferentially in a bearing 72 in the case, but is prevented from moving axially by means of a screwed collar 73 which is locked by a grub screw 74. The second sleeve is bored to receive a thrust bearing 75 which abuts in one direction against a collar formed in the second sleeve and in the other against a shoulder formed on the adapter 76, if such is provided, or against a collar screwed to the external boss of the main hub. The case is provided with feet 77 by which it is attached to some fixed portion of the vehicle propelled by the propeller. In one method of application to an aeroplane, the feet are drilled to receive studs 78 which are carried in a bridge-piece or yoke 79 spanning the end of the frame of the aeroplane. These studs are provided with washers and split pins to prevent accidental detachment of the case. A spindle 80 conveniently made of tube fitting over and pinned to the spindle of the worm is provided with an outer bearing 81 supported on the yoke and is fitted with a pulley 82 which, in the form shown, is coupled by means of a flexible cable to a control pulley 83 arranged to run on a spindle in a bracket 84 mounted conveniently to the pilot's hand. A handwheel 85 is fixed to the spindle of the control pulley, whereby the pilot may rotate the pulleys and thereby the worm, in either direction.

The action of the mechanism is as follows:

If the worm is rotated by the pilot in either direction by means of the handwheel pulley, cable and second pulley spindle, the second cam is rotated and, since it cannot move axially, the latter will either push the first cam axially to the left against the axial force from the flanged ring, or allow it to move to the right under the action of that force depending on which way the pilot rotates the handwheel.

In this manner the pitch of the propeller may be varied within the limits of the apparatus.

When the propeller is brought to rest, either voluntarily or through engine failure, the flanged ring will move to the left under the action of the main balancing spring until it comes to rest against the back face of the main hub. In this case, the two cams are separated, but without rotation, consequently when the propeller is again started and has reached a speed sufficient for the centrifugal force to overcome the balancing spring the cams engage once more in precisely the same relative positions as before the propeller was brought to rest. The propeller will therefore restart with the same pitch as it had before stopping, provided no movement of the pilot's handwheel has taken place.

The resultant axial force upon the flanged ring within reasonable variations of propeller speed should be arranged to act toward the right. This is accomplished by so proportioning the balancing spring that the centrifugal component is under all running conditions in excess of the spring pressure. The consequence of this is that any back lash which may exist in the operating mechanism now described has no effect upon the propeller pitch.

The hub shell is provided conveniently with a stiffening flange 52 at its open end, which is lightened, say, by drilling, thus providing conveniently for balancing of the structure. A light cover 53 to close the open end of the hub shell is also provided. I provide also for the casing-in of the hub periphery with a light shell 54 to reduce the windage of the sockets on the hub. I may also round off the contour at the end of the hub by a curved conical disk 55, in order to reduce air resistance. This disk is made detachable for easy access to the mechanism.

In cases where it is not desired to vary the pitch of the propeller, but only to alter its effective diameter at will, I may omit the co-acting screw elements adapted to rotate the blades. It may be desirable again, in some cases, to get the combined effect of increased effective diameter along with pitch variation, and by the present invention, any desired combination of these can readily be obtained.

It is not essential that the radial and angular movement of the blades should be inter-dependent e. g. the radial movement may be accomplished by the means described, but the screw elements for securing the angular movement of the blades may be replaced by any other suitable means.

In the case of propellers working in liquids, the design may be considerably varied. For example, the method hereinbefore described of securing the blades to the hub may be unnecessary.

Having now described my invention what I claim as new and desire to secure by Letters Patent is:—

1. A screw propeller comprising a hub with approximately radial sockets, propeller blades having their spigot ends slidable relative to the hub sockets, a ring element slidable axially relative to the hub, connective tension elements each jointed at one end to the ring element and at the other end to the spigot end of one of the blades, and means for displacing and controlling the ring element axially relative to the hub and of checking its movement under the resultant axial component due to centrifugal force on the blades and thereby effecting a variation of effective diameter of the blades.

2. A screw propeller as set forth in claim 1, comprising co-acting screw elements on the spigot ends of the blades and on the hub sockets respectively, whereby relative radial movement is accompanied by a variation of effective pitch of the blades.

3. In a screw propeller as set forth in claim 1, the combination therewith of protective metal shells in fixed relationship to the wooden spigot ends of the blades adapted to be slidable relative to the hub sockets as aforesaid.

4. Means for firmly fastening the spigot ends of the blades to the protective shells referred to in claim 3, comprising a cylindrical inner surface for each of the said shells, a long conical surface of decreasing diameter toward the inner end of the blade spigot, a neck of reduced diameter and a short conical shoulder at the outer end of the blade spigot, a ring made in halves screwed to the mouth of the protective shell and fitting on the said short conical shoulder and an expansible wedge sleeve fitting between the inner conical end of the blade spigot and the cylindrical inner surface of the protective shell.

5. A screw propeller as set forth in claim 1, wherein a coaxial spring device is provided between the hub and the ring element opposing the resultant axial force on the latter due to the centrifugal force on the blades which is transmitted thereto by the tension elements.

6. Means for displacing and controlling the ring element referred to in claim 1 and checking its movement under the resultant axial component due to centrifugal force on the blades, comprising a thrust element co-axial with the propeller shaft in fixed relationship to the ring element, a non-rotating axially displacement element, a ball thrust bearing between the two said elements, and means for axially displacing the said non-rotating element.

7. Means as set forth in claim 6, comprising also connecting elements projecting through the hub casing between the ring element and the thrust element.

8. Means as set forth in claim 6 comprising also an element displaceable angularly but not axially in contact with the said non-rotating axially displaceable element, cam surfaces on the two said elements, a ball thrust bearing between the angularly displaceable element and a shoulder in fixed relationship to the propeller shaft, and means for displacing the angularly displaceable element.

In testimony whereof I have signed my name to this specification.

ERNEST ABINGTON VESSEY.